(12) United States Patent
Li et al.

(10) Patent No.: US 12,359,947 B2
(45) Date of Patent: Jul. 15, 2025

(54) DEFECT MONITORING APPARATUS AND DETECTION METHOD FOR TRANSFORMER OIL CONSERVATOR BASED ON EDGE COMPUTING

(71) Applicant: STATE GRID SHANXI ELECTRIC POWER RESEARCH INSTITUTE, Shanxi (CN)

(72) Inventors: Jinsong Li, Shanxi (CN); Hua Yu, Shanxi (CN); Qingsong Chen, Shanxi (CN); Hong Liu, Shanxi (CN); Guodong Li, Shanxi (CN); Guangqi Mu, Shanxi (CN); Shuai Li, Shanxi (CN); Like Dong, Shanxi (CN); Jin Zhao, Shanxi (CN); Hui Yuan, Shanxi (CN); Xuan Wang, Shanxi (CN); Zhumao Lu, Shanxi (CN); Min Jiang, Shanxi (CN); Shuai Wang, Shanxi (CN); Shengzhi Chang, Shanxi (CN)

(73) Assignee: STATE GRID SHANXI ELECTRIC POWER RESEARCH INSTITUTE, Taiyuan (CN)

( * ) Notice: Subject to any disclaimer, the term of this patent is extended or adjusted under 35 U.S.C. 154(b) by 393 days.

(21) Appl. No.: 17/947,201

(22) Filed: Sep. 19, 2022

(65) Prior Publication Data
US 2023/0146976 A1    May 11, 2023

Related U.S. Application Data

(63) Continuation of application No. PCT/CN2022/105947, filed on Jul. 15, 2022.

(30) Foreign Application Priority Data

Nov. 6, 2021 (CN) .......................... 202111309674.6

(51) Int. Cl.
*G01D 21/02* (2006.01)
*G01K 7/26* (2006.01)
(Continued)

(52) U.S. Cl.
CPC ............... *G01D 21/02* (2013.01); *G01K 7/26* (2013.01); *H01F 27/14* (2013.01); *H04W 88/16* (2013.01)

(58) Field of Classification Search
CPC ...... F04B 39/121; F16D 66/027; F28F 27/00; G01D 21/02; G01F 23/284; G01K 7/26;
(Continued)

(56) References Cited

U.S. PATENT DOCUMENTS

| 8,400,320 | B2 * | 3/2013 | Santos | ................. | G01F 23/185 |
| | | | | | 340/622 |
| 2022/0128539 | A1 * | 4/2022 | Harris | ...................... | H04Q 9/00 |

FOREIGN PATENT DOCUMENTS

| CN | 204964777 U | * | 1/2016 |
| CN | 111386446 A | | 7/2020 |

(Continued)

OTHER PUBLICATIONS

Li, Shuaibing & Bo, Gao & Wu, Guangning. (2016). Influences of oil flow speed and temperature on partial discharge properties in transformer oil. 1-4. 10.1109/AUPEC.2016.7749302. (Year: 2016).*
(Continued)

*Primary Examiner* — Lisa M Caputo
*Assistant Examiner* — Eric Sebastian Von Wald

(57) ABSTRACT

Disclosed are a defect monitoring apparatus and detection method for a transformer oil conservator based on edge computing. The monitoring apparatus includes: a sensing terminal, an edge intelligent gateway, a monitoring terminal, an oil conservator defect monitoring cloud platform, and a client terminal. The edge intelligent gateway and the moni-
(Continued)

toring terminal are both disposed in a substation. The monitoring terminal is configured to access the edge intelligent gateway. The sensing terminal includes: an airflow sensor, an oil temperature sensor, an ambient temperature sensor, and a microwave oil level measurement assembly. The sensing terminal sends detection data information to the edge intelligent gateway, and the edge intelligent gateway stores and determines a category of the detection data information. The present disclosure can recognize capsule damage, partial blockage of a breathing circuit, leakage in the breathing circuit, moisture impurities in a breathing tube, and false oil level.

10 Claims, 4 Drawing Sheets

(51) Int. Cl.
*H01F 27/14* (2006.01)
*H04W 88/16* (2009.01)

(58) Field of Classification Search
CPC .......... G01K 13/00; G01K 1/024; G01K 1/14; G01K 2207/04; G01K 5/48; G01K 7/427; G01K 1/08; G01K 13/02; G01K 13/028; G01K 1/026; G01K 3/14; G01L 19/142; G01L 19/0007; G01L 19/0645; G01L 7/082; G01L 19/0038; G01N 2203/0617; G01N 27/20; G01N 33/2888; G01N 29/222; G01N 33/0075; G01N 33/1886; G01R 31/003; G01R 33/56308; G01R 1/20; G06F 17/18; G06N 3/045; G06Q 10/06395; G08B 21/0492; G08C 17/02; G16Y 40/10; G16Y 40/20; G16Y 40/50; H01F 27/14; H01F 27/402; H01F 2027/406; H04B 7/18582; H04L 67/10; H04L 67/12; H04L 43/08; H04L 43/0817; H04L 63/1416; H04Q 9/00; H04W 88/16; H04W 4/38

See application file for complete search history.

(56) References Cited

FOREIGN PATENT DOCUMENTS

| | | | |
|---|---|---|---|
| CN | 111667985 A | * | 9/2020 |
| CN | 112880750 A | | 6/2021 |
| CN | 112903024 A | | 6/2021 |
| CN | 216283672 U | | 4/2022 |
| EP | 2732266 A2 | | 5/2014 |
| JP | 2015046458 A | | 3/2015 |

OTHER PUBLICATIONS

Moldoveanu, Constantin & Brezoianu, Virgil & Vasile, Aurelian & Ursianu, Victor & Goni, Florin & Radu, Constantin & Ionita, Irene. (2010). Intelligent system for the on-line real time monitoring of high voltage substations. 1-8. 10.1109/ISGTEUROPE.2010.5638936. (Year: 2010).*

Xiaoli Qin et al., Research on Device for Monitoring Rupture of Oil Pillow Capsule of Transformer, Electronics World, 2015, pp. 141-142, No. 24.

Lei Zhang et al., Prediction of transformer average oil temperature and winding hot spot temperature by edge computation based on LSTSVR model, Electric Power Automation Equipment, Aug. 2020, pp. 197-202, vol. 40, No. 8.

* cited by examiner

DEFECT MONITORING APPARATUS AND DETECTION METHOD FOR TRANSFORMER OIL CONSERVATOR BASED ON EDGE COMPUTING

CROSS REFERENCE TO RELATED APPLICATIONS

The present application is a Continuation Applications of PCT Application No. PCT/CN2022/105947 filed on Jul. 15, 2022, which claims the benefit of Chinese Patent Application No. 202111309674.6 filed on Nov. 6, 2021. All the above are hereby incorporated by reference in their entirety.

TECHNICAL FIELD

The present disclosure relates to the technical field of oil conservators of electric power oil-immersed equipment, and in particular, to a defect monitoring apparatus and detection method for a transformer oil conservator based on edge computing.

BACKGROUND

An oil-immersed transformer is the most important device in transmission and substation equipment, and its safe and reliable operation is crucial. An oil conservator is one of the most important parts of the oil-immersed transformer, and is mainly used to buffer a volume change caused by an oil temperature change in an oil tank during the operation of the transformer. The oil conservator is disposed above the oil tank of the transformer, and is usually connected to a dehydrating breather and kept open to the outside atmosphere. When the oil temperature of the transformer increases, the oil volume expands, and the oil conservator exhales air to the outside; when the oil temperature of the transformer decreases, the oil volume decreases and air is inhaled from the atmosphere. This is the breathing of the oil conservator. In a commonly used capsule oil conservator, a capsule bag is added to an inner wall of the oil conservator, and the interior of the capsule bag is in communication with the atmosphere through a dehydrating breather and connecting tubes thereof. A bottom surface of the capsule bag floats on and is closely attached to the oil conservator, such that no air exists between the capsule bag and the oil level and the oil level is isolated from air, which prevents oil oxidation and prevents external moisture and impurities from entering.

In the power industry, due to the long operation of the transformer, failures often occur in the oil conservator, bringing great difficulty to transformer operation and maintenance, and even causing transformer damage and shutdown in serious cases. In a HVDC transmission project, there have been several cases of rupture of oil conservator capsule bags of the converter transformer, which seriously threatened the stable operation of the HVDC transmission project. Currently, the main problems in the operation of the oil conservator are as follows: First, the aging, cracking or damage of the capsule due to improper installation causes the capsule to lose its protective function, while it is difficult to observe whether the capsule is broken or folded because it is inside the oil conservator. Second, due to transformer vibration, poor installation quality and other factors, connection between the oil conservator and other parts as well as pipelines are prone to leakage, resulting in the entry of air moisture, affecting the quality of the oil and thus reducing the insulation effect. Third, the desiccant of the dehydrating breather is clumped with moisture and clogs the dehydrating breather, resulting in the blockage of the breathing circuit of the oil conservator, which causes oil spray and shutdown of the transformer in serious cases. Fourth, a false oil level occurs in the oil conservator, which is not easy to detect in the daily inspection, thus seriously affecting the safe operation of the transformer.

In most of the currently disclosed technologies, the method for oil conservator detection of a power transformer is to install a sensor inside the capsule. However, the sensor is prone to failure during long-term operation of the transformer and may cause other problems for the capsule. For example, in the European Patent Application No. 12741136.1 and the paper "Research on Device for Monitoring Rupture of Oil Pillow Capsule of Transformer" (Electronic World, 2015, No. 24), the capsule damage defect is monitored by installing a light source and a sensor inside the capsule to compare the light signal received by the sensor before and after the capsule damage, and the placement of sensors inside the capsule may bring other negative effects to the capsule in long-term operation. The Chinese Patent Application No. 202110178347.5 discloses a sensor group of an online intelligent monitoring device for an oil conservator and a health status value calculation method, in which a health status value of an oil conservator is obtained by calculation based on 9 sensors and corresponding parameter signals thereof. However, the process of calculating the health status value does not consider the operation principle of the oil conservator and involves as many as 9 sensors. These internal sensors induce other problems during long-term operation and lead to the failure of the oil conservator of the transformer, causing damage to the transformer.

SUMMARY

The present disclosure overcomes the shortcomings of the prior art and provides a defect monitoring apparatus and detection method for a transformer oil conservator based on edge computing, to effectively monitor and recognize defects of the oil conservator, such as capsule damage, partial blockage of a breathing circuit, leakage in the breathing circuit, moisture impurities in a breathing tube, and false oil level. According to a relationship between relative changes in an oil temperature and flow rates of air exhaled and inhaled from the oil conservator, oil level of the oil conservator is detected using microwaves, to detect and diagnose defects of the oil conservator in a non-contact manner. Once the defects of the oil conservator are detected and diagnosed, in the present disclosure, an alarm command is sent to a client terminal of a transformer operator in real time through a cloud platform, which gives the transformer operation and maintenance personnel valuable processing time for maintenance and repair, thereby greatly improving the efficiency and further ensuring the safe operation of power equipment.

To solve the above technical problems, the technical solutions adopted by the present disclosure are as follows:

A defect monitoring apparatus for a transformer oil conservator based on edge computing includes: a sensing terminal, an edge intelligent gateway, a monitoring terminal, an oil conservator defect monitoring cloud platform, and a client terminal. The edge intelligent gateway and the monitoring terminal are both disposed in a substation. The monitoring terminal is configured to access the edge intelligent gateway. The sensing terminal includes: an airflow sensor, an oil temperature sensor, an ambient temperature sensor, and a microwave oil level measurement assembly. The airflow sensor is disposed on a breathing tube, and is configured to measure a breathing airflow rate of an oil conservator. The oil temperature sensor is disposed at a lower portion of a side of the oil conservator, and a probe of the oil temperature sensor extends into the oil conservator and is immersed in transformer oil. The oil temperature sensor is configured to measure an oil temperature of the oil conservator. The ambient temperature sensor is disposed outside the oil conservator. The ambient temperature sensor is configured to measure an ambient temperature. The microwave oil level measurement assembly is disposed at a top of an inner wall of the oil conservator, and the microwave oil level measurement assembly is away from a capsule. The microwave oil level measurement assembly is configured to measure a height of an oil level of the oil conservator.

The sensing terminal is configured to send detection data to the edge intelligent gateway, and an original oil level gauge of the oil conservator is configured to send data information thereof to the edge intelligent gateway. The edge intelligent gateway is configured to store and evaluate the detection data, and send an evaluation result indicating a defect and corresponding data to the oil conservator defect monitoring cloud platform. The oil conservator defect monitoring cloud platform is configured to send an alarm command to the client terminal. The client terminal may be a personal computer (PC), a tablet computer, or a smart phone. The alarm command may be an email prompt alarm or a short message prompt alarm. Meanwhile, the transformer operation and maintenance personnel can use the client terminal to access the oil conservator defect monitoring cloud platform, to query specific data information. The monitoring terminal is configured to access the edge intelligent gateway. Operation and maintenance personnel in the substation can access data content in the edge intelligent gateway through the monitoring terminal at any time, which facilitates operation of local personnel.

Further, the microwave oil level measurement assembly includes: a microwave transmitting antenna and a microwave receiving antenna, where the microwave transmitting antenna and the microwave receiving antenna are both oriented towards the oil face, upper ends of the microwave transmitting antenna and the microwave receiving antenna are both fastened at the top of the inner wall of the oil conservator, and a transmitting end of the microwave transmitting antenna is located in a same horizontal plane with a receiving end of the microwave receiving antenna.

Further, the sensing terminal communicates with the edge intelligent gateway through a ZigBee network; the edge intelligent gateway communicates with the monitoring terminal through the ZigBee network, and the edge intelligent gateway communicates with the oil conservator defect monitoring cloud platform through a General Packet Radio Service (GPRS) network.

Further, the airflow sensor is disposed close to a dehydrating breather, such that data detection of the airflow sensor is more accurate.

Further, the airflow sensor is configured to adopt bidirectional airflow rate measurement, with a measurement range of −200 slpm to +200 slpm, a total error band less than or equal to 3% of a reading, and a response time less than or equal to 1 ms.

The oil temperature sensor and the ambient temperature sensor are both platinum resistance sensors, with a measurement range of −40° C. to 120° C. and accuracy of ±0.5° C.

The edge intelligent gateway is configured to adopt an ARM Cortex-A7 processor, with 1 GB RAM and 8 GB Embedded Multi Media Card (eMMC).

A defect detection method for a transformer oil conservator based on edge computing includes the following steps:
S1: monitoring, by a sensing terminal, the following data in real time: a breathing airflow rate of an oil conservator, an oil temperature of the oil conservator, an ambient temperature, a microwave transmitting power, and a microwave receiving power;
S2: determining whether the oil conservator has a false oil level defect: calculating an actual oil level height $D_1$ according to the microwave transmitting power and the microwave receiving power; sending, by an original oil level gauge of the oil conservator, data information to an edge intelligent gateway; calculating, by the edge intelligent gateway, a difference between the actual oil level height $D_1$ and a display value D of the original oil level gauge of the oil conservator; and when the difference is greater than 3 cm, determining that the oil conservator has a false oil level defect; otherwise, determining that the oil conservator has no false oil level defect;
S3: sampling real-time monitoring data, to form a breathing airflow rate curve; when a change in the ambient temperature is within 10° C. and a change in the oil temperature of the oil conservator is within 4° C., comparing a peak breathing airflow rate $V_m$ of the oil conservator monitored in real time with an average peak breathing airflow rate $V_a$ of the oil conservator in the passing month under the same condition; if a difference is greater than or equal to 15%, performing step S4; otherwise, determining that the following four types of defects do not exist: capsule damage, partial blockage of a breathing circuit, leakage in the breathing circuit, or moisture impurities in a breathing tube;
S4: when $V_m \geq 1.2V_a$, $t_h \leq 0.9t_{ha}$, and $t_x \leq 0.9t_{xa}$, determining that a capsule damage defect exists;
where $t_h$ is a single expiration duration monitored in real time, $t_x$ is a single inhalation duration monitored in real time, $t_{ha}$ is an average single expiration duration in the passing month, and $t_{xa}$ is an average single inhalation duration in the passing month;
when $V_m \leq 0.8V_a$, $t_h \geq 1.1t_{ha}$, and $t_x \geq 1.1t_{xa}$, determining that a defect of partial blockage of the breathing circuit exists;
when $V_m \leq 0.8V_a$, $|t_h - t_{ha}| < 0.05t_{ha}$, and $|t_x - t_{xa}| < 0.05t_{xa}$, determining that a defect of leakage in the breathing circuit exists; and
when $V_m \leq 0.85V_a$ and an airflow rate zero-crossing number $x_0$ of a single expiration and inhalation process increases by 2 times or more compared with an average airflow rate zero-crossing number $x_{a0}$ in the passing month, determining that a defect of moisture impurities in a breathing tube exists;
S5: calculating a comprehensive evaluation coefficient for defect detection of the oil conservator, to obtain defect severity;
S6: when the defect severity is a general defect or a severe defect, sending, by the edge intelligent gateway, an evaluation result and corresponding data to an oil conservator defect monitoring cloud platform, where the evaluation result includes the comprehensive evaluation coefficient and defect information; and
S7: sending, by the oil conservator defect monitoring cloud platform, an alarm command to a client terminal, such that the transformer operation and maintenance personnel access the oil conservator defect monitoring cloud platform through the client terminal to check specific information.

Further, a formula for calculating the actual oil level height $D_1$ in step S2 is as follows:

$$D_1 = H - d - h$$

where H is a height from the bottom to the top of the interior of the oil conservator, d is a distance from a transmitting end of a microwave transmitting antenna to an oil level, and h is a distance from the transmitting end of the microwave transmitting antenna to the top of the interior of the oil conservator;

$$d = \sqrt{\frac{P_t G_t G_r \lambda^2}{4\pi^2 P_r} - \frac{1}{4}S^2}$$

where S is a distance from the transmitting end of the microwave transmitting antenna to a receiving end of a microwave receiving antenna, $\lambda$ is a wavelength, $P_t$ is a microwave transmitting power of the microwave transmitting antenna, $G_t$ is a gain of the microwave transmitting antenna, $P_r$ is a detected power of the microwave receiving antenna, and $G_r$ is a gain of the microwave receiving antenna; microwaves transmitted by the microwave transmitting antenna are reflected by the oil level and then enter the microwave receiving antenna; the microwave receiving antenna detects a power and a gain; as a height of the oil level changes, the microwave power received by the microwave receiving antenna also changes, and thus d can be calculated based on the above data.

Further, a formula for calculating the comprehensive evaluation coefficient $c_k$ for defect detection of the oil conservator is as follows:

$$c_k = 1.2 p_k^2 + 0.4 d_k^{\frac{1}{3}} + 0.7 x_k^{\frac{2}{3}} + 1.5 j_k^{\frac{2}{3}} + 0.2 s_k^{1.2}$$

where when a capsule damage defect exists, a characteristic value $p_k$ is 2; otherwise, $p_k$ is 1;

when a defect of partial blockage of the breathing circuit exists, a characteristic value $d_k$ is 2; otherwise, $d_k$ is 1;

when a defect of leakage in the breathing circuit exists, a characteristic value $x_k$ is 2; otherwise, $x_k$ is 1;

when a defect of moisture impurities in a breathing tube exists, a characteristic value $s_k$ is 2; otherwise, $s_k$ is 1;

when a defect of false oil level of the oil conservator exists, a characteristic value $j_k$ is 2; otherwise, $j_k$ is 1; and the defect severity is determined according to a value of the comprehensive evaluation coefficient $c_k$ for defect detection of the oil conservator:

when $c_k$=4, the defect severity is no defect;

when $4 < c_k \leq 4.8$, the defect severity is the general defect; and when $c_k > 4.8$, the defect severity is the severe defect.

Compared with the prior art, the present disclosure has the following beneficial effects:

The airflow sensor, oil temperature sensor and ambient temperature sensor used in the present disclosure are simple to install and highly practical. By monitoring relative changes of the oil temperature of the transformer and analyzing changes of parameters related to breathing of the oil conservator through comparison with historical breathing data of the transformer, in combination with microwave detection of the oil level of the oil conservator, common defects of the oil conservator, such as capsule cracking and false oil level, can be comprehensively studied and judged, and the defect severity of the oil conservator can be evaluated. The present disclosure is an original technology, and the determination method is clear and operative.

The present disclosure adopts a non-contact detection method, which has no negative effect on the operation of the transformer, and the detection is safe, reliable and effective, solving the sensing failure during long-term operation of multiple built-in sensors and other quality problems induced by improper installation in the conventional method. The oil conservator monitoring apparatus of the present disclosure is based on network architecture of edge computing, which enables the operation and maintenance personnel to grasp the operation status of the oil conservator remotely at any time, and also solves the problems of high latency, unstable network and low bandwidth under the traditional Internet of Things cloud computing.

Through the present disclosure, the breathing condition of the transformer is monitored in real time, and the circulation of the oil in the transformer body is known in time, to avoid damage to the transformer caused by local overheating due to poor oil circulation. The present disclosure greatly saves manpower and material resources, and at the same time strongly improves the level of safe operation of the transformer as well as intelligent operation and maintenance of the substation, and has broad application prospects.

The present disclosure adopts the edge intelligent gateway with a computing function. The edge intelligent gateway can realize storage and processing of detection data information. Moreover, the edge intelligent gateway can be directly accessed by the existing monitoring terminal in the substation, which greatly reduces the cost of transformation.

BRIEF DESCRIPTION OF THE DRAWINGS

The present disclosure is described in detail below with reference to the accompanying drawings.

Figure 1:
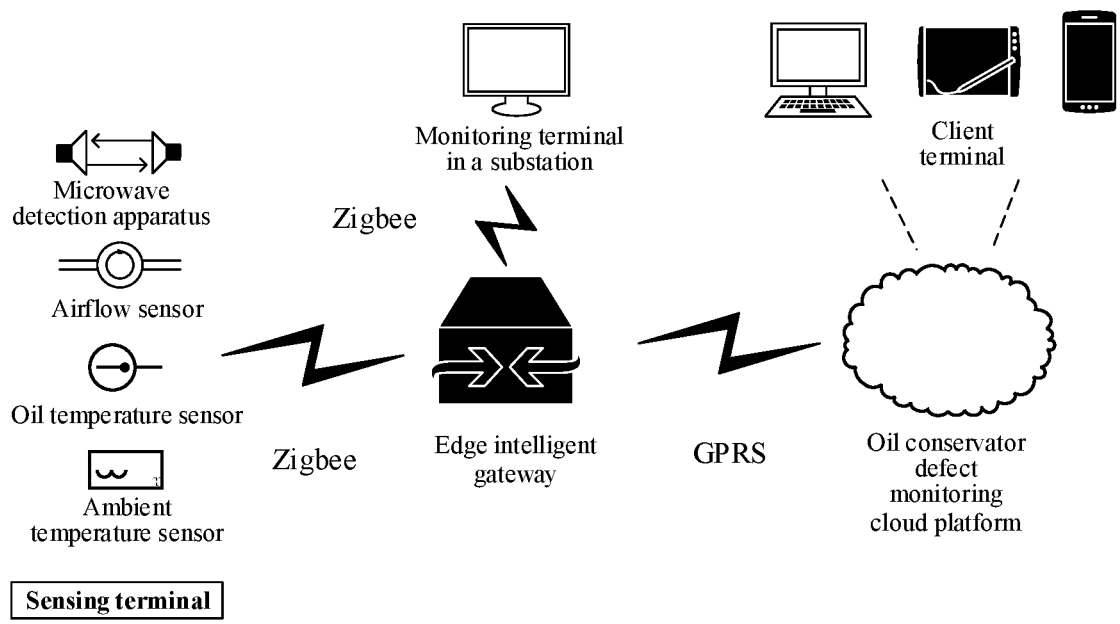
FIG. 1 is a structural diagram of the present disclosure.

In the drawings: 1 is an oil conservator, 2 is a capsule, 3 is a breathing tube, 4 is a dehydrating breather, 5 is an airflow sensor, 6 is an oil temperature sensor, 7 is an ambient temperature sensor, 8 is an oil level gauge, 9 is a microwave transmitting antenna, and 10 is a microwave receiving antenna.

DETAILED DESCRIPTION

The present disclosure will be further described below in conjunction with specific embodiments.

Figure 2:
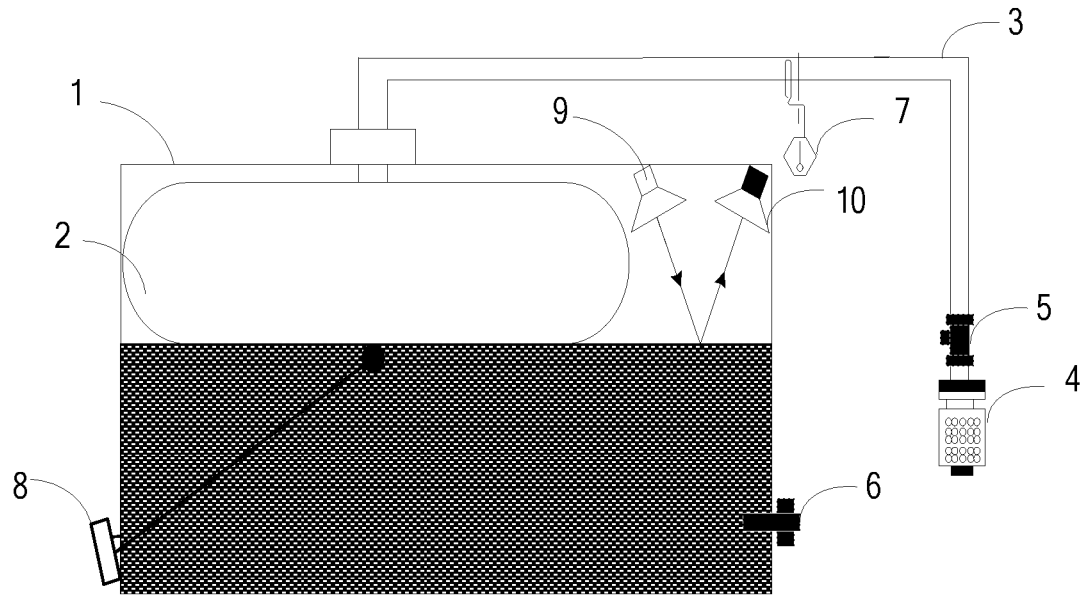
FIG. 2 is a schematic diagram of installation of a sensing terminal according to the present disclosure.

As shown in FIG. 1 and FIG. 2, a defect monitoring apparatus for a transformer oil conservator based on edge computing includes: a sensing terminal, an edge intelligent gateway, a monitoring terminal, an oil conservator defect monitoring cloud platform, and a client terminal. The edge intelligent gateway and the monitoring terminal are both disposed in a substation. The monitoring terminal is configured to access the edge intelligent gateway. The sensing terminal includes: an airflow sensor 5, an oil temperature sensor 6, an ambient temperature sensor 7, and a microwave oil level measurement assembly. The airflow sensor 5 is disposed on a breathing tube 3, and is configured to measure a breathing airflow rate of an oil conservator 1. The oil temperature sensor 6 is disposed at a lower portion of a side of the oil conservator 1, and a probe of the oil temperature sensor 6 extends into the oil conservator 1 and is immersed in transformer oil. The oil temperature sensor 6 is configured to measure an oil temperature of the oil conservator. The ambient temperature sensor 7 is disposed outside the oil conservator 1. The ambient temperature sensor 7 is configured to measure an ambient temperature. The microwave oil level measurement assembly is disposed at a top of an inner wall of the oil conservator 1, and the microwave oil level measurement assembly is away from a capsule 2. The microwave oil level measurement assembly is configured to measure a height of an oil level of the oil conservator.

The sensing terminal sends detection data to the edge intelligent gateway, and an original oil level gauge 8 of the oil conservator also sends data information thereof to the edge intelligent gateway. The edge intelligent gateway stores and evaluates the detection data. The edge intelligent gateway sends an evaluation result indicating a defect and corresponding data to the oil conservator defect monitoring cloud platform. The oil conservator defect monitoring cloud platform sends an alarm command to the client terminal.

The microwave oil level measurement assembly includes: a microwave transmitting antenna 9 and a microwave receiving antenna 10, where the microwave transmitting antenna 9 and the microwave receiving antenna 10 are both oriented towards the oil face, upper ends of the microwave transmitting antenna 9 and the microwave receiving antenna 10 are both fastened at the top of the inner wall of the oil conservator 1, and a transmitting end of the microwave transmitting antenna 9 is located in a same horizontal plane with a receiving end of the microwave receiving antenna 10.

The sensing terminal communicates with the edge intelligent gateway through a ZigBee network; the edge intelligent gateway communicates with the monitoring terminal through the ZigBee network, and the edge intelligent gateway communicates with the oil conservator defect monitoring cloud platform through a GPRS network.

The airflow sensor 5 is disposed close to a dehydrating breather 4.

The airflow sensor 5 adopts bidirectional airflow rate measurement, with a measurement range of −200 slpm to +200 slpm, a total error band less than or equal to 3% of a reading, and a response time less than or equal to 1 ms.

The oil temperature sensor 6 and the ambient temperature sensor 7 are both platinum resistance sensors, with a measurement range of −40° C. to 120° C. and accuracy of ±0.5° C.

The edge intelligent gateway adopts an ARM Cortex-A7 processor, with 1 GB RAM and 8 GB eMMC.

The client terminal may be a personal computer (PC), a tablet computer, or a smart phone, and supports an email prompt alarm of the PC and the tablet computer, and a short message prompt alarm of the smart phone.

A defect detection method for a transformer oil conservator based on edge computing includes the following steps:

S1: A sensing terminal monitors the following data in real time: a breathing airflow rate of an oil conservator, an oil temperature of the oil conservator, an ambient temperature, a microwave transmitting power, and a microwave receiving power.

S2: Determine whether the oil conservator has a false oil level defect: calculate an actual oil level height $D_1$ according to the microwave transmitting power and the microwave receiving power; an original oil level gauge of the oil conservator sends data information to an edge intelligent gateway; the edge intelligent gateway calculates a difference between the actual oil level height $D_1$ and a display value D of the original oil level gauge 8 of the oil conservator; and when the difference is greater than 3 cm, determine that the oil conservator has a false oil level defect; otherwise, determine that the oil conservator has no false oil level defect.

S3: Sample real-time monitoring data, to form a breathing airflow rate curve; when a change in the ambient temperature is within 10° C. and a change in the oil temperature of the oil conservator is within 4° C., compare a peak breathing airflow rate $V_m$ of the oil conservator monitored in real time with an average peak breathing airflow rate $V_a$ of the oil conservator in the passing month under the same condition; if a difference is greater than or equal to 15%, perform step S4; otherwise, determine that the following four types of defects do not exist: capsule damage, partial blockage of a breathing circuit, leakage in the breathing circuit, or moisture impurities in a breathing tube.

Figure 3:
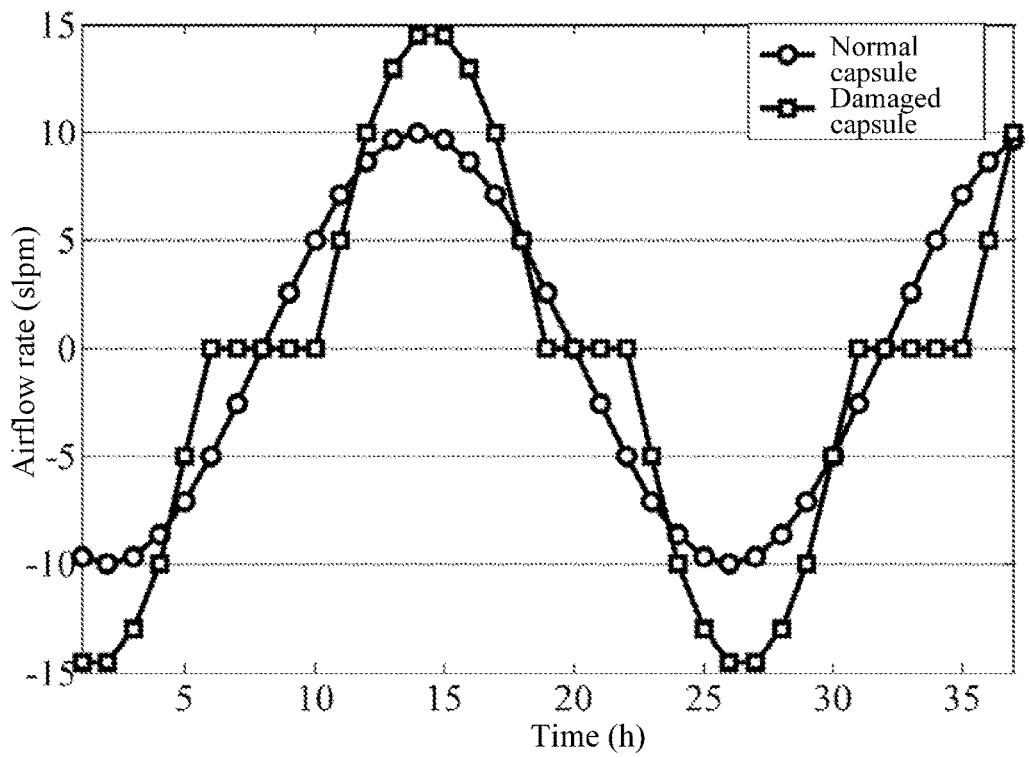
FIG. 3 is a diagram of an airflow rate curve when a capsule damage defect occurs according to the present disclosure.
Figure 4:
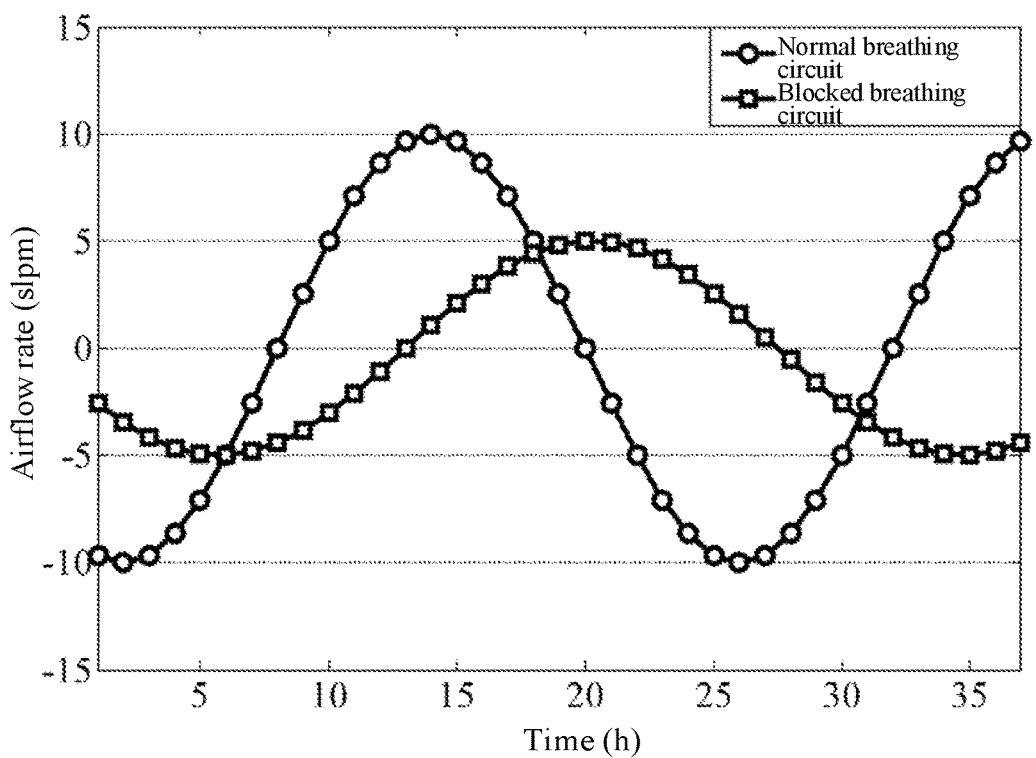
FIG. 4 is a diagram of an airflow rate curve when a defect of partial blockage of a breathing circuit occurs according to the present disclosure.
Figure 5:
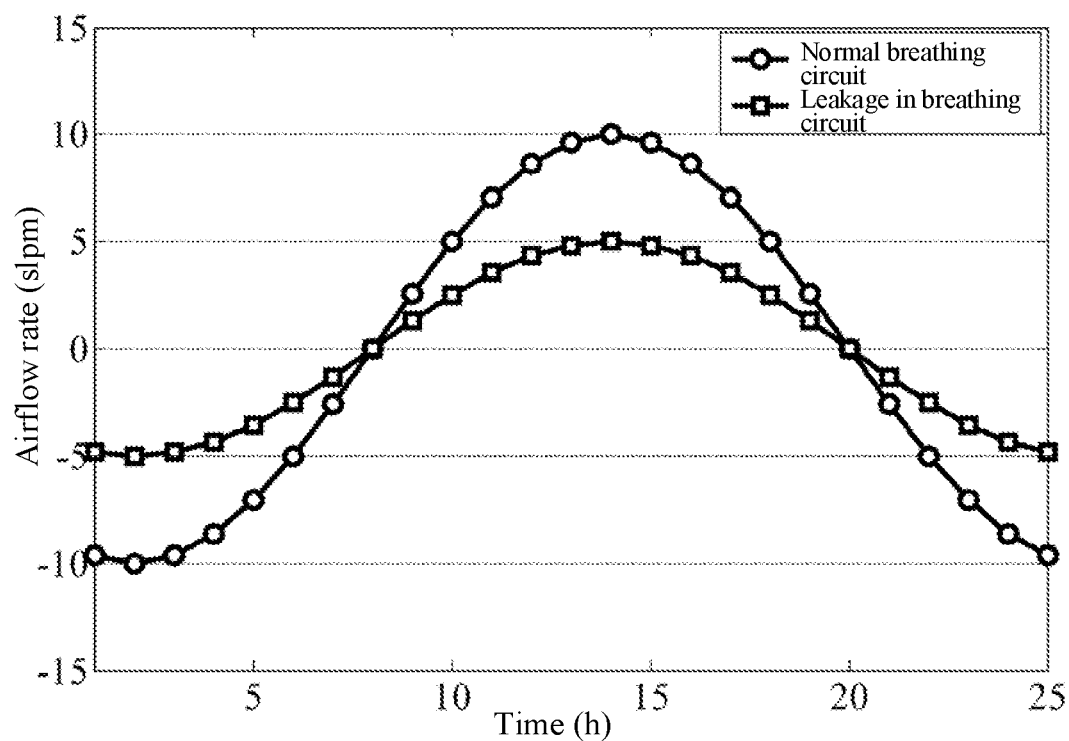
FIG. 5 is a diagram of an airflow rate curve when a defect of leakage in a breathing circuit occurs according to the present disclosure.
Figure 6:
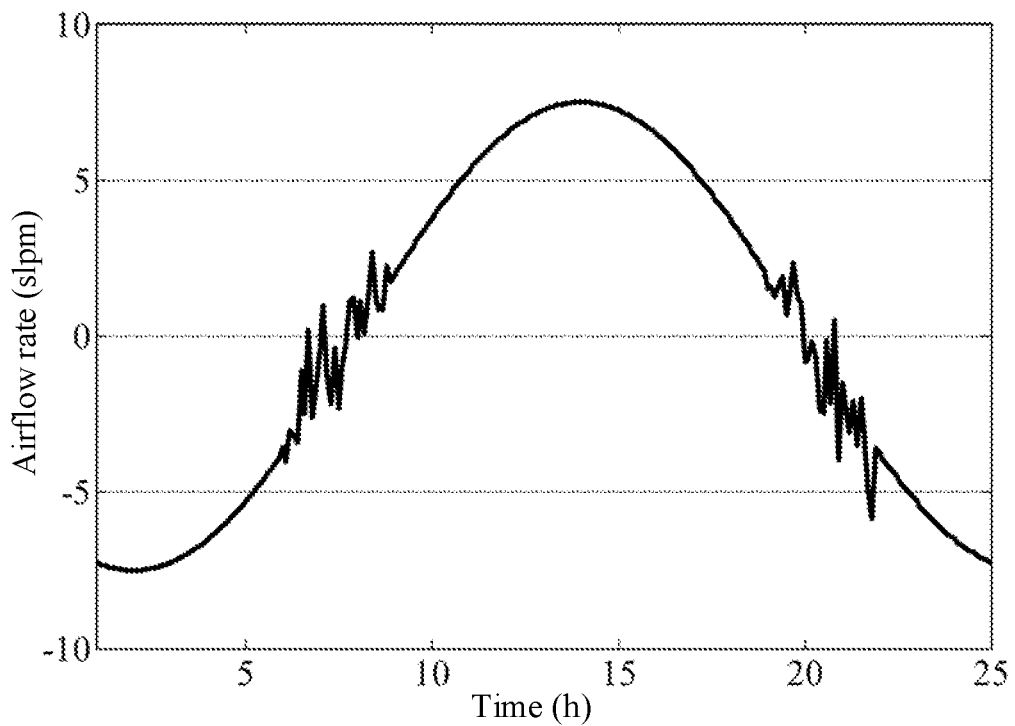
FIG. 6 is a diagram of an airflow rate curve when a defect of moisture impurities in a breathing tube occurs according to the present disclosure.

S4: As shown in FIG. 3, when $V_m \geq 1.2V_a$, $t_h \leq 0.9t_{ha}$, and $t_x \leq 0.9t_{xa}$, determine that a capsule damage defect exists.

where $t_h$ is a single expiration duration monitored in real time, $t_x$ is a single inhalation duration monitored in real time, $t_{ha}$ is an average single expiration duration in the passing month, and $t_{xa}$ is an average single inhalation duration in the passing month;

as shown in FIG. 4, when $V_m \leq 0.8V_a$, $t_h \geq 1.1t_{ha}$, and $t_x \geq 1.1t_{xa}$, determine that a defect of partial blockage of the breathing circuit exists;

as shown in FIG. 5, when $V_m \leq 0.8V_a$, $|t_h - t_{ha}| < 0.05t_{ha}$, and $|t_x - t_{xa}| < 0.05t_{xa}$, determine that a defect of leakage in the breathing circuit exists; and as shown in FIG. 6, when $V_m \leq 0.85V_a$ and an airflow rate zero-crossing number $x_0$ of a single expiration and inhalation process increases by 2 times or more compared with an average airflow rate zero-crossing number $x_{a0}$ in the passing month, determine that a defect of moisture impurities in a breathing tube exists.

S5: Calculate a comprehensive evaluation coefficient for defect detection of the oil conservator, to obtain defect severity.

S6: When the defect severity is a general defect or a severe defect, the edge intelligent gateway sends an evaluation result and corresponding data to an oil conservator defect monitoring cloud platform.

S7: The oil conservator defect monitoring cloud platform sends an alarm command to a client terminal, such that staff access the oil conservator defect monitoring cloud platform through the client terminal to check specific information.

A formula for calculating the actual oil level height $D_1$ in step S2 is as follows:

$$D_1 = H - d - h$$

where H is a height from the bottom to the top of the interior of an oil conservator, d is a distance from a transmitting end of a microwave transmitting antenna to an oil level, and h is a distance from the transmitting end of the microwave transmitting antenna to the top of the interior of the oil conservator;

$$d = \sqrt{\frac{P_t G_t G_r \lambda^2}{4\pi^2 P_r} - \frac{1}{4}S^2}$$

Figure 7:
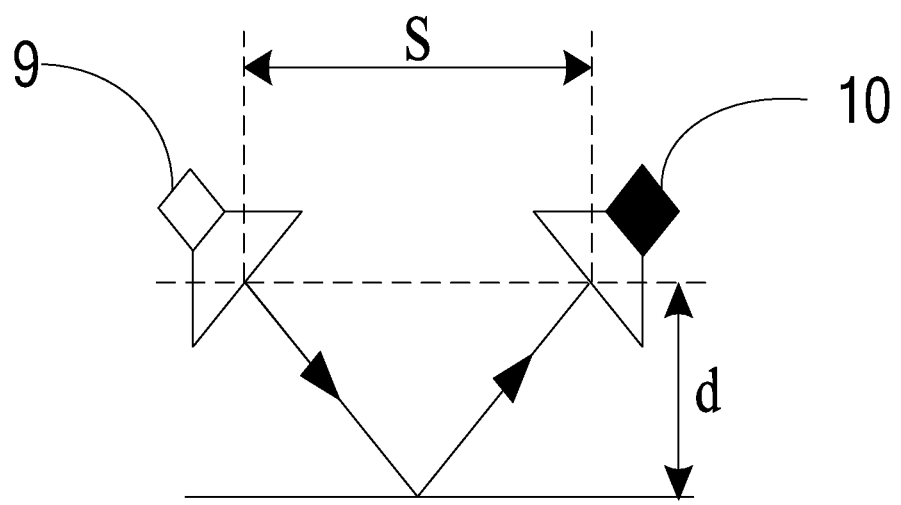
FIG. 7 is a schematic diagram of a microwave oil level measurement assembly according to the present disclosure.

As shown in FIG. 7, S is a distance from the transmitting end of the microwave transmitting antenna to a receiving end of a microwave receiving antenna, λ is a wavelength, $P_t$ is a microwave transmitting power of the microwave transmitting antenna, $G_t$ is a gain of the microwave transmitting antenna, $P_r$ is a detected power of the microwave receiving antenna, and $G_r$ is a gain of the microwave receiving antenna.

A formula for calculating the comprehensive evaluation coefficient $c_k$ for defect detection of the oil conservator is as follows:

$$c_k = 1.2 p_k^2 + 0.4 d_k^{\frac{1}{3}} + 0.7 x_k^{\frac{2}{3}} + 1.5 j_k^{\frac{2}{3}} + 0.2 s_k^{1.2}$$

where when a capsule damage defect exists, a characteristic value $p_k$ is 2; otherwise, $p_k$ is 1;

when a defect of partial blockage of the breathing circuit exists, a characteristic value $d_k$ is 2; otherwise, $d_k$ is 1;

when a defect of leakage in the breathing circuit exists, a characteristic value $x_k$ is 2; otherwise, $x_k$ is 1;

when a defect of moisture impurities in a breathing tube exists, a characteristic value $s_k$ is 2; otherwise, $s_k$ is 1;

when a defect of false oil level of the oil conservator exists, a characteristic value $j_k$ is 2; otherwise, $j_k$ is 1; and the defect severity is determined according to a value of the comprehensive evaluation coefficient $c_k$ for defect detection of the oil conservator:

when $c_k$=4, the defect severity is no defect;

when 4<$c_k$≤4.8, the defect severity is the general defect; and when $c_k$>4.8, the defect severity is the severe defect.

The above embodiments are merely intended to exemplarily illustrate the principles and effects of the present disclosure, rather than to limit the present disclosure. Any person skilled in the art can make modifications or alterations to the foregoing embodiments without departing from the spirit and scope of the present disclosure. Hence, all equivalent modifications or alterations made by those of ordinary skill in the art without departing from the spirit and technical teachings disclosed in the present disclosure shall fall within the scope defined by appended claims to the present disclosure.

The invention claimed is:

1. A defect monitoring apparatus for a transformer oil conservator based on edge computing, comprising: a sensing terminal, an edge intelligent gateway, a monitoring terminal, an oil conservator defect monitoring cloud platform, a client terminal and an original oil level gauge (8) of the oil conservator, wherein the edge intelligent gateway and the monitoring terminal are both disposed in a substation; the monitoring terminal is configured to access the edge intelligent gateway; the sensing terminal comprises: an airflow sensor (5), an oil temperature sensor (6), an ambient temperature sensor (7), and a microwave oil level measurement assembly; the airflow sensor (5) is disposed on a breathing tube (3), and is configured to measure a breathing airflow rate of an oil conservator (1); the oil temperature sensor (6) is disposed at a lower portion of a side of the oil conservator (1), and a probe of the oil temperature sensor (6) extends into the oil conservator (1) and is immersed in transformer oil; the oil temperature sensor (6) is configured to measure an oil temperature of the oil conservator; the ambient temperature sensor (7) is disposed outside the oil conservator (1); the ambient temperature sensor (7) is configured to measure an ambient temperature; the microwave oil level measurement assembly is disposed at a top of an inner wall of the oil conservator (1), and the microwave oil level measurement assembly is away from a capsule (2); the microwave oil level measurement assembly is configured to measure a height of an oil level of the oil conservator;

the sensing terminal communicates with the edge intelligent gateway; the edge intelligent gateway communicates with the monitoring terminal; and the edge intelligent gateway communicates with the oil conservator defect monitoring cloud platform; and the sensing terminal is configured to send detection data to the edge intelligent gateway, and the original oil level gauge (8) of the oil conservator is configured to send data information thereof to the edge intelligent gateway; the edge intelligent gateway is configured to store and evaluate the detection data and the data information of the original oil level gauge (8), and send an evaluation result indicating a defect and corresponding data to the oil conservator defect monitoring cloud platform; and the oil conservator defect monitoring cloud platform is configured to send an alarm command to the client terminal.

2. The defect monitoring apparatus for a transformer oil conservator based on edge computing according to claim 1, wherein the microwave oil level measurement assembly comprises: a microwave transmitting antenna (9) and a microwave receiving antenna (10); the microwave transmitting antenna (9) and the microwave receiving antenna (10) are both oriented towards the oil face, upper ends of the microwave transmitting antenna (9) and the microwave receiving antenna (10) are both fastened at the top of the inner wall of the oil conservator (1), and a transmitting end of the microwave transmitting antenna (9) is located in a same horizontal plane with a receiving end of the microwave receiving antenna (10).

3. The defect monitoring apparatus for a transformer oil conservator based on edge computing according to claim 1, wherein the edge intelligent gateway communicates with the oil conservator defect monitoring cloud platform through a General Packet Radio Service (GPRS) network.

4. The defect monitoring apparatus for a transformer oil conservator based on edge computing according to claim 1, wherein the airflow sensor (5) is disposed above a dehydrating breather (4).

5. The defect monitoring apparatus for a transformer oil conservator based on edge computing according to claim 1, wherein the airflow sensor (5) is configured to adopt bidirectional airflow rate measurement, with a measurement range of −200 slpm to +200 slpm, a total error band less than or equal to 3% of a reading, and a response time less than or equal to 1 ms.

6. The defect monitoring apparatus for a transformer oil conservator based on edge computing according to claim 1, wherein the oil temperature sensor (6) and the ambient temperature sensor (7) are both platinum resistance sensors, with a measurement range of −40° C. to 120° C. and accuracy of ±0.5° C.

7. The defect monitoring apparatus for a transformer oil conservator based on edge computing according to claim 1, wherein the edge intelligent gateway is configured to adopt processor; and the client terminal is a personal computer (PC), a tablet computer, or a smart phone.

8. A defect detection method for a transformer oil conservator based on edge computing, comprising the following steps:
  S1: monitoring, by a sensing terminal, the following data in real time: a breathing airflow rate of an oil conservator, an oil temperature of the oil conservator, an ambient temperature, a microwave transmitting power, and a microwave receiving power;
  S2: determining whether the oil conservator has a false oil level defect: calculating an actual oil level height D1 according to the microwave transmitting power and the microwave receiving power; sending, by an original oil level gauge (8) of the oil conservator, data information to an edge intelligent gateway; calculating, by the edge intelligent gateway, a difference between the actual oil level height D1 and a display value D of the original oil level gauge (8) of the oil conservator; and when the difference is greater than 3 cm, determining that the oil conservator has a false oil level defect; otherwise, determining that the oil conservator has no false oil level defect; wherein the data information of the original oil level gauge (8) is the display value D of the original oil level gauge (8);
  S3: sampling the real-time monitoring data, to form a breathing airflow rate curve; when a change in the ambient temperature is within 10° C. and a change in the oil temperature of the oil conservator is within 4° C., comparing a peak breathing airflow rate $V_m$ of the oil conservator monitored in real time with an average peak breathing airflow rate $V_a$ of the oil conservator in the passing month under a same condition; if a difference is greater than or equal to 15%, performing step S4; otherwise, determining that the following four types of defects do not exist: capsule damage, partial blockage of a breathing circuit, leakage in the breathing circuit, or moisture impurities in a breathing tube;
  S4: when $V_m \geq 1.2V_a$, $t_h \leq 0.9t_{ha}$, and $t_x \leq 0.9t_{xa}$, determining that a capsule damage defect exists;
  wherein $t_h$ is a single expiration duration monitored in real time, $t_x$ is a single inhalation duration monitored in real time, $t_{ha}$ is an average single expiration duration in the passing month, and $t_{xa}$ is an average single inhalation duration in the passing month;
  when $V_m \leq 0.8V_a$, $t_h \geq 1.1t_{ha}$, and $t_x \geq 1.1t_{xa}$, determining that a defect of partial blockage of the breathing circuit exists;
  when $V_m \leq 0.8V_a$, $|t_h - t_{ha}| < 0.05t_{ha}$, and $|t_x - t_{xa}| < 0.05t_{xa}$, determining that a defect of leakage in the breathing circuit exists; and
  when $V_m \leq 0.85V_a$ and an airflow rate zero-crossing number $x_0$ of a single expiration and inhalation process increases by 2 times or more compared with an average airflow rate zero-crossing number $x_{a0}$ in the passing month, determining that a defect of moisture impurities in a breathing tube exists;
  S5: calculating a comprehensive evaluation coefficient for defect detection of the oil conservator, to obtain defect severity;
  S6: when the defect severity is a general defect or a severe defect, sending, by the edge intelligent gateway, an evaluation result and corresponding data to an oil conservator defect monitoring cloud platform; and
  S7: sending, by the oil conservator defect monitoring cloud platform, an alarm command to a client terminal, which transformer operation and maintenance personnel access the oil conservator defect monitoring cloud platform through the client terminal.

9. The defect detection method for a transformer oil conservator based on edge computing according to claim 8, wherein a formula for calculating the actual oil level height $D_1$ in step S2 is as follows:

$$D_1 = H - d - h$$

wherein H is a height from the bottom to the top of the interior of the oil conservator, d is a distance from a transmitting end of a microwave transmitting antenna to an oil level, and h is a distance from the transmitting end of the microwave transmitting antenna to the top of the interior of the oil conservator;

$$d = \sqrt{\frac{P_t G_t G_r \lambda^2}{4\pi^2 P_r} - \frac{1}{4}S^2}$$

wherein S is a distance from the transmitting end of the microwave transmitting antenna to a receiving end of a microwave receiving antenna, $\lambda$ is a wavelength, $P_t$ is a microwave transmitting power of the microwave transmitting antenna, $G_t$ is a gain of the microwave transmitting antenna, $P_r$ is a detected power of the microwave receiving antenna, and $G_r$ is a gain of the microwave receiving antenna.

10. The defect detection method for a transformer oil conservator based on edge computing according to claim 8, wherein a formula for calculating the comprehensive evaluation coefficient $c_k$ for defect detection of the oil conservator is as follows:

$$c_k = 1.2p_k^2 + 0.4d_k^{\frac{1}{3}} + 0.7x_k^{\frac{2}{3}} + 1.5j_k^{\frac{2}{3}} + 0.2s_k^{1.2}$$

wherein when a capsule damage defect exists, a characteristic value $p_k$ is 2; otherwise, $p_k$ is 1;
  when a defect of partial blockage of the breathing circuit exists, a characteristic value $d_k$ is 2; otherwise, $d_k$ is 1;
  when a defect of leakage in the breathing circuit exists, a characteristic value $x_k$ is 2; otherwise, $x_k$ is 1;
  when a defect of moisture impurities in a breathing tube exists, a characteristic value $s_k$ is 2; otherwise, $s_k$ is 1;
  when a defect of false oil level of the oil conservator exists, a characteristic value $j_k$ is 2; otherwise, $j_k$ is 1; and
  the defect severity is determined according to a value of the comprehensive evaluation coefficient $c_k$ for defect detection of the oil conservator:
  when $c_k = 4$, the defect severity is no defect;
  when $4 < c_k \leq 4.8$, the defect severity is the general defect; and
  when $c_k > 4.8$, the defect severity is the severe defect.

* * * * *